(12) United States Patent
Wilson

(10) Patent No.: US 9,824,211 B2
(45) Date of Patent: Nov. 21, 2017

(54) SYSTEM AND METHOD TO VISUALIZE USER SESSIONS

(71) Applicant: FireEye, Inc., Milpitas, CA (US)

(72) Inventor: Theodore Wilson, Pottstown, PA (US)

(73) Assignee: FireEye, Inc., Milpitas, CA (US)

( * ) Notice: Subject to any disclaimer, the term of this patent is extended or adjusted under 35 U.S.C. 154(b) by 145 days.

(21) Appl. No.: 14/028,074

(22) Filed: Sep. 16, 2013

(65) Prior Publication Data

US 2014/0280245 A1 Sep. 18, 2014

Related U.S. Application Data

(60) Provisional application No. 61/788,667, filed on Mar. 15, 2013.

(51) Int. Cl.
*G06F 17/30* (2006.01)
*G06F 21/55* (2013.01)

(52) U.S. Cl.
CPC .... G06F 21/552 (2013.01); *G06F 2221/2151* (2013.01)

(58) Field of Classification Search
CPC ....................................................... G06F 17/30
See application file for complete search history.

(56) References Cited

U.S. PATENT DOCUMENTS

| | | | |
|---|---|---|---|
| 7,051,029 B1 * | 5/2006 | Fayyad et al. | 707/999.01 |
| 7,937,387 B2 | 5/2011 | Frazier et al. | |
| 8,006,305 B2 | 8/2011 | Aziz | |
| 8,069,484 B2 | 11/2011 | McMillan et al. | |
| 8,171,553 B2 | 5/2012 | Aziz et al. | |
| 8,291,499 B2 | 10/2012 | Aziz et al. | |
| 8,375,444 B2 | 2/2013 | Aziz et al. | |
| 8,516,593 B2 | 8/2013 | Aziz | |
| 8,528,086 B1 | 9/2013 | Aziz | |
| 8,549,638 B2 | 10/2013 | Aziz | |
| 8,566,476 B2 | 10/2013 | Shiffer et al. | |
| 8,584,239 B2 | 11/2013 | Aziz et al. | |
| 8,689,333 B2 | 4/2014 | Aziz | |
| 8,713,681 B2 | 4/2014 | Silberman et al. | |
| 8,793,278 B2 | 7/2014 | Frazier et al. | |
| 8,793,787 B2 | 7/2014 | Ismael et al. | |
| 8,832,829 B2 | 9/2014 | Manni et al. | |
| 8,850,571 B2 | 9/2014 | Staniford et al. | |
| 8,881,271 B2 | 11/2014 | Butler, II | |
| 8,935,779 B2 | 1/2015 | Manni et al. | |
| 8,949,257 B2 | 2/2015 | Shiffer et al. | |
| 8,966,036 B1 * | 2/2015 | Asgekar et al. | 709/223 |
| 8,990,939 B2 | 3/2015 | Staniford et al. | |
| 8,997,219 B2 | 3/2015 | Staniford et al. | |
| 9,027,135 B1 | 5/2015 | Aziz | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,171,160 B2 | 10/2015 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,294,501 B2 | 3/2016 | Mesdaq et al. | |

(Continued)

*Primary Examiner* — Khanh Pham
(74) *Attorney, Agent, or Firm* — Rutan & Tucker, LLP

(57) ABSTRACT

A system and method operable to identify and analyze persistent state information among a plurality of software-related events, and present persistent state information in a unified fashion.

21 Claims, 1 Drawing Sheet

(56) References Cited

U.S. PATENT DOCUMENTS

| | | |
|---|---|---|
| 9,300,686 B2 | 3/2016 | Pidathala et al. |
| 2005/0010572 A1* | 1/2005 | Clark ................ G06F 17/30592 707/999.01 |
| 2009/0113246 A1* | 4/2009 | Sabato ................ G06F 11/0769 714/37 |
| 2009/0254313 A1* | 10/2009 | Armour et al. ............... 702/187 |
| 2010/0094767 A1* | 4/2010 | Miltonberger ................ 705/325 |
| 2010/0115443 A1* | 5/2010 | Richstein ............ G06F 11/0769 715/771 |
| 2010/0235880 A1* | 9/2010 | Chen .................... H04L 63/102 726/1 |
| 2013/0227691 A1 | 8/2013 | Aziz et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0372980 A1 | 12/2015 | Eyada |
| 2016/0044000 A1 | 2/2016 | Cunningham |
| 2016/0127393 A1 | 5/2016 | Aziz et al. |

\* cited by examiner

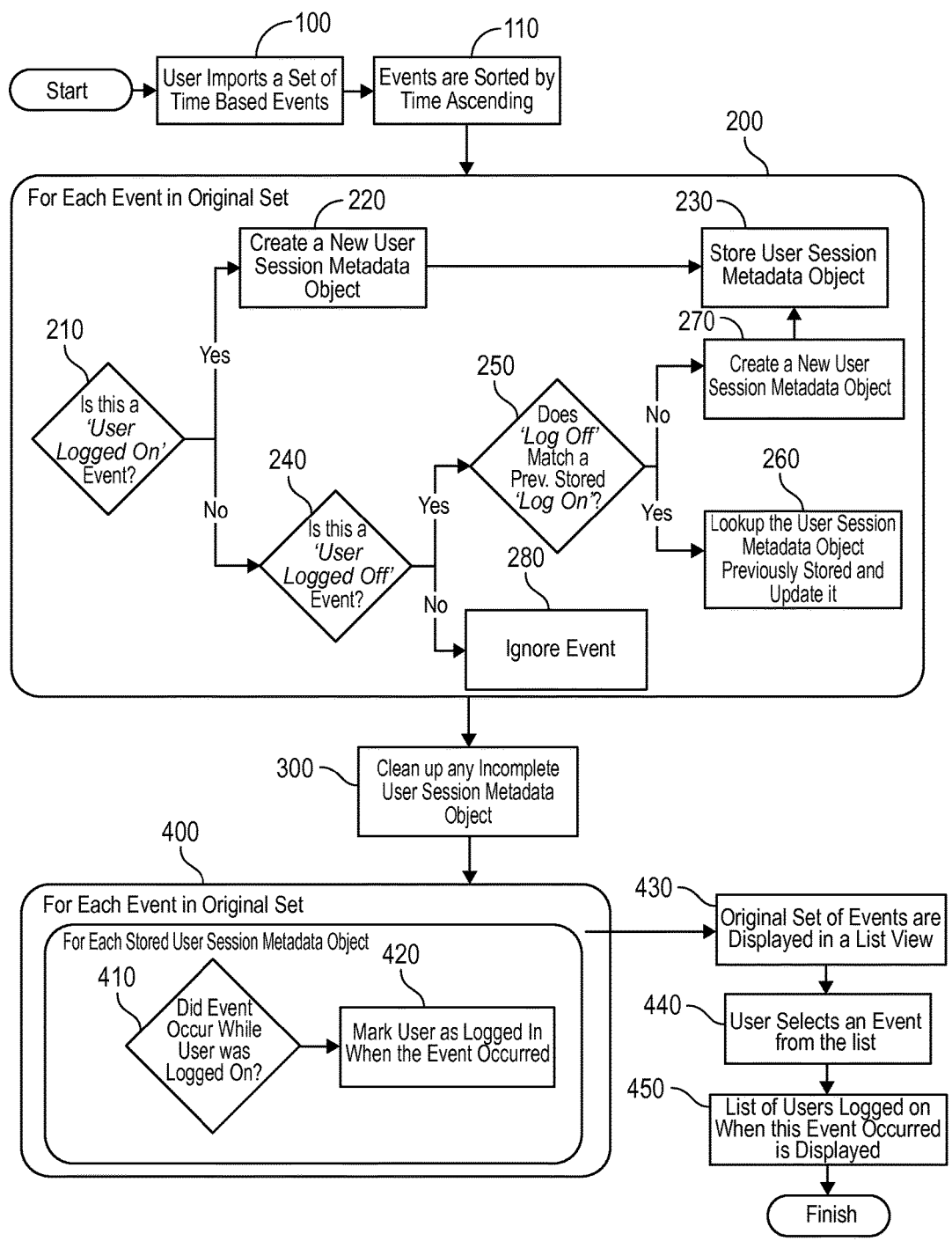

SYSTEM AND METHOD TO VISUALIZE USER SESSIONS

CROSS-REFERENCE TO RELATED APPLICATION

This patent application claims priority to U.S. Patent Application Ser. No. 61/788,667 filed Mar. 15, 2013, and titled System and Method to Visualize User Sessions, the entire contents of which is incorporated herein by reference in its entirety.

BACKGROUND

1. Field

The present inventive concept pertains to a system and method to visualize overlapping events related to and possibly affecting computer software. The present inventive concept more particularly concerns a system and method to visualize user sessions.

2. Discussion of Related Art

A thorough investigation of software problems such as security breaches or execution of malware often involves analysis of a multitude of software-related events. These events can be recorded in association with one or more specific times or "timestamps" that may relate to when certain aspects of the event, the event itself, or other system changes occurred. For example, some events can be associated with a single specific time while others extend or persist over a period of time and thus may be associated with multiple recorded times. An example of an event that extends over a period of time is a user logon session. Currently, because investigators lack adequate tools, events extending over a period of time are not readily apparent to the investigators and may be overlooked, which may result in flawed investigation results, particularly if the event in question is critical.

Thus, there is a need for a system and method to present information to an investigator in a more persistent context so that an investigator's ability to perceive and make decisions based on correlating individual events and persistent context is improved.

SUMMARY

The present inventive concept described herein remedies the aforementioned problems by providing a unique system and method operable to identify and analyze persistent state information, and present persistent state information to an investigator in a unified fashion.

The present inventive concept provides a system and method operable to identify and extract persistent information, e.g., a user session, from a plurality of software-related events, and to visualize the persistent information with respect to others of the plurality of software-related events to determine, among other things, which of the plurality of software-related events occurred during a period of time when the persistent information persists. "Software-related event(s)" is used broadly herein to refer to any event, including without limitation a change in computer state, occurring and/or recorded within a computer system.

The aforementioned may be achieved in an aspect of the present inventive concept by providing a method to visualize a user session. The method includes the steps of identifying a persistent event from a plurality of software-related events, comparing the persistent event to the others of the plurality of software-related events, and/or determining whether any of the others of the plurality of software-related events have a timestamp during the period of time of the persistent event. The persistent event may have at least one timestamp, and may persist for a period of time. The method may include the step of displaying information relating to the persistent event and the others of the plurality of software-related events that have a timestamp during the period of time.

The persistent event may be an ongoing event having a start time and a stop time, and/or persisting for the period of time. The ongoing event may begin at a user logon to a computer system. The start time may be assigned by identifying an earliest timestamp among a plurality of known timestamps and the stop time may be assigned by identifying a latest-known timestamp among the plurality of known timestamps. The plurality of known timestamps may be timestamps sorted in chronological order, and the timestamps and other system information may be exported for analysis from the system on which the events being examined occurred to a forensic system. The persistent event may include two separate events spaced from each other along a timeframe. Each of the two separate events may represent one of a start time and a stop time for the persistent event. The others of the plurality of software-related events may be events occurring in chronological order after the start time for the persistent event and before the stop time for the persistent event. The timeframe may include a plurality of events in chronological order.

The aforementioned may be achieved in another aspect of the present inventive concept by providing a system to visualize a user session. The system may include an identifier operable to identify a persistent event from among a plurality of software-related events, a comparator configured to compare the persistent event to the others of the plurality of software-related events, and/or a determiner configured to determine whether any of the others of the plurality of software-related events have an associated timestamp during the period of time. The persistent event may persist for a period of time that includes others of the plurality of software-related events.

The system may include a display operable to display the persistent event and the others of the plurality of software-related events that have a timestamp during the period of time. The persistent event may include at least one of a start time and a stop time for an ongoing event that persists for the period of time.

The aforementioned may be achieved in another aspect of the present inventive concept by providing a method to carve out and visualize a user session on a network. The method may include the steps of importing a plurality of time-based events, sorting the plurality of time-based events according to their timestamps in chronological order, determining whether the plurality of time-based events includes one of a user logged on event and a user logged off event, creating a new user session metadata object for each one of the plurality of time-based events that is a user logged on event, determining whether at least one of the time-based events occurred after a user logged on event, and/or displaying a list containing identification information of a user associated with the user logged on event if at least one of the time-based events occurred between a user logged on event and before a corresponding user logged off event. The list containing identifying information may be presented visually within or apart from the list of sorted time-based events.

The method may further include the step of determining whether a user logged off event corresponds to a user logged on event. The corresponding user logged off event may be previously saved or stored in a database connected to a system of the present inventive concept or contained in the imported plurality of time-based events. The method may further include the step of assigning an earliest known timestamp to each one of the plurality of time-based events that does not have a start timestamp. The method may further include the step of assigning a latest known timestamp to each one of the plurality of time-based events that does not have an end timestamp.

Additional aspects, advantages, and utilities of the present inventive concept will be set forth in part in the description which follows and, in part, will be obvious from the description, or may be learned by practice of the present inventive concept.

The foregoing is intended to be illustrative and is not meant in a limiting sense. Many features and subcombinations of the present inventive concept may be made and will be readily evident upon a study of the following specification and accompanying drawings comprising a part thereof. These features and subcombinations may be employed without reference to other features and subcombinations.

BRIEF DESCRIPTION OF THE DRAWINGS

The present inventive concept is described in detail below with reference to the attached drawing FIGURES, wherein:

FIG. 1 is a diagram illustrating an example of a process of the present inventive concept.

The drawing FIGURES do not limit the present inventive concept to the specific examples disclosed and described herein. The drawings are not necessarily to scale, emphasis instead being placed upon clearly illustrating the principles of the present inventive concept.

DETAILED DESCRIPTION

The following detailed description references the accompanying drawings that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one embodiment of the present inventive concept. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein.

The present inventive concept provides a system with a corresponding method operable to identify one or more persistent software-related events from a computer-generated list of a plurality of software-related events having timestamps during a timeframe selected by a user or investigator. The persistent event is an event that extends over a period of time and includes at least one of a start timestamp and a stop timestamp. The persistent event generally represents a change of state of a computer system that is ongoing with respect to the timeframe. The computer system may be a computer system such as that sold under the trademark WINDOWS®.

The system identifies the persistent event based on one or more factors related to and/or indicative of the persistent event. The one or more factors are provided to the system by, for example, a programmer and/or user, and stored in a memory of the system. One of the one or more factors used to identify the persistent event may include, for example, time of occurrence information, which may be available for each of a plurality of events. Time of occurrence information may be derived from one or more timestamps, for example, one or more timestamps derived from an event log such as the event log provided by the computer system sold under the trademark WINDOWS®.

Upon identification of the persistent event, the system is configured to correlate the time of occurrence information for the persistent event to other persistent and/or non-persistent or discrete events, and preferably all of the events contained within the timeframe selected by the investigator and/or corresponding to the lifetime of the persistent event. Upon correlation of the persistent event to the other persistent and/or discrete events, the system is configured to extract such for further processing by the system and/or analysis by the investigator. In this manner, the system is operable to identify and extract one or more persistent events that persist over a period of time and/or a plurality of discrete and/or single timestamp events.

The persistent event generally includes at least two discrete events, each having a timestamp at a single point in time spaced from each other, e.g., chronologically, along (e.g., at the beginning or end) of the timeframe. An example of such discrete events includes, but is not limited to, a user logon and/or user logoff to a computer system. Thus, two of the discrete events generally represent a start and a stop of a change of state of the computer system. The computer system may be a computer system such as that sold under the trademark WINDOWS®. Identification of a persistent event by the system of the present inventive concept is facilitated using two or more discrete events of the persistent event, such as a start and a stop of a change of state.

The system of the present inventive concept is also operable to identify a persistent event using only one discrete event having a timestamp at a single point in time along the timeframe, for example, using only one of a start timestamp and a stop timestamp. This scenario may occur when the period of time of software-related events being analyzed by the investigator only includes a single relevant timestamp. A corresponding other relevant timestamp may occur beyond the period of time selected by the investigator. An example of this is where a user has logged onto a computer system, but has not logged off as of the last event being examined. Thus, the system of the present inventive concept is operable to identify the persistent event even if it persists longer than the timeframe selected by the investigator, that is, does not include a second corresponding discrete event which may be used to bound the timeframe of the persistent event.

In this manner, the system of the present inventive concept is also operable to use one or more discrete events to infer and identify a persistent state. For persistent states that are bounded by only one discrete event, that persistent state or event may be considered applicable for all values of time after, or before (depending on the event in question) the time of such discrete event, and may be considered to have affected other persistent and/or discrete events. An example of this is a scenario in which an event log indicates a user was logged in from time A to time B as evidenced by an event log readout stating "User Logged On" Event at time A but no corresponding "User Logged Off" Event occurring prior to time B, which represents the end of the timeframe over which information is being examined.

The system of the present inventive concept is operable to store each persistent state event with related information in the memory. Such related information may include, but is not limited to, a name, a category, and a description of dates and/or times to which each of the persistent and/or discrete events are related. Additional content may also be inferred and stored in some embodiments, for example, a username from a user log on event may be parsed from a Message Field associated with the event in an event log.

To properly bracket or associate the two discrete events to infer the persistent state and/or corresponding change of state of the computer system, the system of the present inventive concept utilizes and correlates other, additional content. For example, two persistent states are recognized using the following three discrete events that may be listed by the event log: (1) User A Logged on; (2) User B Logged off; and (3) User A Logged off. The first (1) and third (3) of the discrete events represent a persistent state and event gleaned from the event log and associated or bracketed by the system of the present inventive concept using labels such as "log on" and "log off" and that also identify the same username, that is, User A. The second (2) of the discrete events represents a persistent state listed by the event log and is only bounded on one end of the timeframe by a timestamp and event, with no beginning timestamp or discrete event.

Upon associating two discrete events to infer a persistent state and event, and a corresponding change of state of the computer system, the system of the present inventive concept is configured to map the persistent and discrete events. This is performed by inferring one or more factors including, but not limited to, a category, a name, and additional content. The inferred one or more factors is then codified into a separate definition format stored in local memory and/or in a local or remotely configured database. The definition format will be consumable, that is, in a format which can be persisted and comprehended by present and future versions of the system which may define new categories, by the system of the present inventive concept to permit the system to create or infer new categories for types of persistent state changes previously not able to be categorized by the system. In this manner, the system of the present inventive concept is capable of learning or otherwise expanding its ability to categorize without manual alteration. The mappings may also be manually built into the system of the present inventive concept, depending on anticipated application or implementation. In the exemplary embodiment, this is accomplished by defining such categories in code and/or as the result of manually coded operations. It is foreseen, however, that the system may represent these categories in a form which can be modified, configured, refined, and/or managed by an end user and/or an automatic system.

The system of the present inventive concept is configured to permit the investigator to manually inject a persistent state into the system using one of a plurality of techniques. "Injecting" a persistent state means to manually select or create one or more timestamps and/or events, and/or a moment in time e.g. in an event log, to act as a boundary(ies) for the persistent state. The investigator may manually specify a time range during which the state will apply using one or two timestamps input into the system of the present inventive concept, for example via an editor of a graphical user interface ("GUI") of the system. Alternatively, the investigator may select one or two events, each with one or more associated timestamps, in the GUI and use a command triggered by, but not limited to, a "Button" and/or "Menu Option", to generate a new persistent state associated with the one or more timestamps. Both options for injecting a new persistent state will require the investigator to provide, at minimum, a name and a category for the new manually-injected persistent state. It is foreseen, however, that additional data may be requested by the system based on application or implementation. The prompting for or specifying of such additional data is handled using the GUI and/or may be automatically extrapolated from events, items and/or associated information.

As previously discussed, the system of the present inventive concept is configured to relate a persistent event occurring during a selected timeframe to a discrete event also occurring during that timeframe. For example, the system may conclude that, at a time associated with Discrete Event A, User A and User B were logged onto the computer system, per the logged-on information deduced from discrete events included in the timeline provided by an event log.

The system of the present inventive concept is configured to display the persistent state represented by an indicator via a display or the like, with the one or more discrete events, represented by one or more different indicators, overlaying the persistent state indicator so that, for example, a user may see better visualize that User A and User B were logged onto the computer system at the time of the discrete event(s). The indicator for the persistent event and/or the indicators for the one or more discrete events may be controlled via the GUI so that all of the indicators are illustrated adjacent to or alongside each other as well as any other instances of related data, that is, data having a timestamp and associated with the persistent event and/or the one or more discrete events. In this manner, the display is operable to visually indicate the persistent state and any overlap or coexistence with other persistent state(s) and one or more discrete events.

The display of the persistent event and/or the one or more discrete events by the display may be provided either directly or indirectly by the system of the present inventive concept. For purposes herein, an "event," is a time-associated item, for example, in the WINDOWS® environment. It is foreseen, however, that an event is not limited to such and may be a state and/or a piece of data associated with a specific time, which may be used as a discrete event. For example, in a scenario where indicators are provided directly, a details pane may be illustrated next to the selected time-associated item. Alternatively, in a scenario where the indicators are provided indirectly, a context menu configured to request additional details for a selected time-associated item may be provided with the context menu configured to open a new view on the display to illustrate any related persistent states. The display of the related persistent states may yield groupings of similar persistent state types, for example, logged on users, active file transfers, and the like.

The indicators for the persistent event and/or the indicators for the one or more discrete events may also be associated with each other using the GUI and one or more visually distinctive interface elements, such as one or more different icons, colors, and/or the like. In this manner, upon associating an event and/or other item having a timestamp that overlaps with a persistent state, the associated event and/or other item will be displayed using the distinctive interface element associated with such persistent event and/or one or more discrete events. For example, all items in the list of events that have a same color, for example, a red background, may indicate that they occurred while user A was logged on. This allows the investigator to quickly review or scan a large number of events and quickly identify items associated with a particular persistent event without individually selecting each item to view additional details.

The system of the present inventive concept is also configured to display a list of all persistent events for the time span selected by the investigator of the system using the GUI. The display of this information allows separate persistent events to be grouped separately according to individual categories. The system of the present inventive concept is configured to allow chronological sorting of the separate persistent events via the GUI. The GUI is configured to display all events and/or time-associated items that occurred in the system during the timeframe selected by the investigator and/or during single and/or multiple selected persistent states.

Turning to FIG. 1, the present inventive concept may function as follows during use. Upon initiation of the system, a user or "administrator" for purposes of clarity in this example, imports one or more time-based events into the system in step 100. More particularly, the administrator starts with a set of time-based events received from, for example, a single host computer or the like. In step 110, the one or more time-based events are sorted in an order after being imported. The sorting of the time-based events is preferably in chronological order, for example, a time-based ascending order based on timestamps associated with each of the one or more events.

For each one of the one or more events, a process 200 is initiated including a number of steps intended to help determine whether a persistent state is evidenced by the event(s), more particularly to determine which of the events represent a user logging on and/or logging off of the host computer. In step 210, the system presents an inquiry to or otherwise queries the administrator regarding whether the current one of the one or more events is a user logged on event. If the administrator responds "yes" to the query of step 210, the system creates a new user session metadata object, in step 220, and sets a session start time to a time of the event. The user session metadata object and related information is saved in step 230, for example, in a database of the system of the present inventive concept.

If the administrator responds "no" to the query of step 210, the system queries the administrator regarding whether the event is a user logged off event, in step 240. If the administrator responds "yes" to the query of step 240, the system queries the administrator regarding whether the log off matches a previously-stored log on for a user, in step 250. If the administrator responds "yes" to the query of step 250, the system looks up and retrieves the user session metadata object previously stored, e.g., in the database, and updates the user session metadata object previously stored with the new information derived from this process, which may optionally include data related to the persistent event or one or more discrete events occurring during or in association with events occurring during a timeframe for the persistent event, in step 260. The updated user session metadata object is then stored, for example, in the database. In this manner, a session or persistent state end time of the user session metadata object previously stored is set to the time of the event. In other words, each time-based event that is not a log on event is compared to previously found or known time-based events and the system is configured to determine if the time-based event is or represents a log off event associated with a corresponding log on event based on a username and/or user session id. Time-based events that are log on or log off events are then stored in metadata objects representing a user session, each of which minimally includes the username with a log on and/or log off time. If the administrator responds "no" to the query of step 250, the system creates a new user session metadata object, in step 270, which is subsequently saved in step 230, e.g., in the database. If the administrator responds "no" the query of step 240, the system ignores the event in step 280 and/or takes no further action to assess the event in the process represented by steps 210 through 280.

In step 300, the system cleans up any incomplete user session metadata objects. More particularly, any user session metadata objects with unknown start times are marked with an earliest known timestamp frame and/or any user session metadata objects with unknown end timestamps are marked with a latest known timestamp frame. In other words, after all of the time-based events have been processed via steps 210-280, any user session that does not have a recorded start or end time is then assumed to have been valid or applicable at least up to the earliest recorded event in the original set of all time-based events, e.g., in the case of no start time, and/or latest recorded event in the original set of all time-based events, e.g., in the case of no end time.

Then, for each of the one or more events, a process 400 is initiated in which the system of the present inventive concept iterates through each of the time-based events in the original set of time-based events again. Alternatively, the system may only make a second pass for events which were not classified as log on or log off events in steps 210-280. In this second pass, the system compares each event against the user sessions' log in timeframes previously calculated or identified to determine which user(s) was logged in to the host machine when the events occurred, and stores any identified associations between user sessions and the events for later visualization, e.g., in the database.

Specifically, in step 410, the administrator is queried regarding whether the event occurred while a user was logged on. In this manner, the system is operable to determine if the event timestamp falls between the start and end times of a user session. If the administrator responds "yes" to the query of step 410 for one or more users, the user(s) is marked as logged in when the event occurred, in step 420. If the administrator responds "no" to the query of step 410 for all users and user sessions, then no action is taken for this timestamp. In step 430, an original set of events is displayed in a list view to the administrator, e.g., via a display. In step 440, the administrator selects an event from the list. In step 450, the list of users logged on when this event occurred is displayed, e.g., in a section of the view reserved for additional details. In other words, after all of the aforementioned processes are executed and completed, the administrator is presented with a visualization that displays each event as an item in a list view, e.g., via the display of the present inventive concept. Upon selecting an individual item from this list, e.g., an event, the administrator is presented, e.g., in a section of the view reserved for additional details, such as a second pane below the list view, with a list of any users who were logged on when this event occurred as identified in the aforementioned processes.

In this manner, the present inventive concept provides a system and method operable to identify, and extract persistent information, e.g., a user session, from a plurality of software-related events, and to visualize the persistent state with respect to others of the plurality of software-related events to determine, among other things, which ones of the plurality of software-related events occurred during a period of time when the persistent information persists. It is anticipated that the system and method may employ pre-determined or user-inputted rules for determining an answer to one or more of the queries posed to the administrator in the description above, without departing from the spirit of the invention. For example, the system of the present inventive concept may call and exchange information with a logical rule for determining whether a discrete event constitutes a login event, instead of or in addition to querying the administrator.

The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A method to visualize a user session on a network, the method comprising:
    identifying a persistent event from a plurality of software-related events, the persistent event (i) including at least a start timestamp and a stop timestamp, and (ii) persisting for a period of time between the start timestamp and the stop timestamp, each of the plurality of software-related events representing a change of state of a computer system;
    comparing the persistent event to a second plurality of software-related events that is a subset of the plurality of software-related events excluding the persistent event to determine whether any of the second plurality of software-related events includes at least one timestamp during the period of time of the persistent event; and
    displaying an indicator associated with a first event of the second plurality of software-related events during at least a portion of the period of time, the indicator associated with the first event of the second plurality of software-related events being displayed to overlay an indicator of the persistent event
    wherein the indicator associated with the first event of the second plurality of software-related events is displayed with a start timestamp associated with an earliest start time of the plurality of software-related events and a stop timestamp corresponds to a timestamp for the first event of the second plurality of software-related events that has occurred during the period of time in response to the first event being a persistent event based on a single timestamp being the stop timestamp without the start timestamp, and
    wherein the indicator associated with the first event of the second plurality of software-related events is displayed with a start timestamp that corresponds to the timestamp for the first event of the second plurality of software-related events that has occurred during the period of time and a stop timestamp associated with a latest stop time of the plurality of software-related events in response to the first event being a persistent event based on a single timestamp being the start timestamp without the stop timestamp.

2. The method of claim 1, wherein the persistent event is an ongoing event (i) including a start time and a stop time, and (ii) persisting for the period of time.

3. The method of claim 2, wherein the start time corresponds to a user logon to a network.

4. The method of claim 2, wherein,
    the start time is assigned by identifying an earliest timestamp among a plurality of known timestamps and the stop time is assigned by identifying a latest-known timestamp among the plurality of known timestamps, and
    the plurality of known timestamps are imported timestamps sorted in chronological order.

5. The method of claim 1, wherein the persistent event includes two separate events spaced from each other along a timeframe, a first separate event of the two separate events representing a start time for the persistent event and a second separate event of the two separate events representing a stop time for the persistent event.

6. The method of claim 5, wherein the second plurality of software-related events are events occurring in chronological order after the start time for the persistent event and before the stop time for the persistent event.

7. The method of claim 1, wherein indicators of each of the second plurality of software-related events are associated with each other using one or more visually distinctive interface elements.

8. The method of claim 7, wherein the one or more visually distinctive interface elements includes a selected color further comprises
    displaying a list of any logged-on users when a second event of the plurality of software related events occurred, upon selection of the second event of the plurality of software-related events.

9. The method of claim 7, wherein the one or more visually distinctive interface elements includes a selected color being used for each indicator associated with the second plurality of software-related events.

10. The method of claim 1, wherein the persistent event is identified using only one discrete event having a timestamp at a single point during the timeframe.

11. The method of claim 1 further comprising
    displaying a list of any logged-on users when a second event of the plurality of software related events occurred, upon selection of the second event of the plurality of software-related events.

12. A system to visualize a user session on a network, the system comprising:
- a display operable to display a persistent event, the persistent event (i) including at least one timestamp, and (ii) persisting for a period of time that is at least partially during a selected timeframe; and
- a processor configured to (i) identify the persistent event from among a plurality of software-related events, the persistent event including at least a start timestamp and a stop timestamp with a change of state that is ongoing for a period of time between the start timestamp and the stop timestamp, each of the plurality of software-related events representing a change of state of a computer system, (ii) compare the persistent event to a second plurality of the software-related events, the second plurality of software-related events corresponds to the plurality of software-related events excluding the persistent event and including a timestamp during the period of time, and (iii) displaying an indicator associated with a first event of the second plurality of software-related events during at least a portion of the period of time, the indicator associated with the first event of the second plurality of software-related events being displayed to overlay an indicator of the persistent event,
- wherein the indicator associated with the first event of the second plurality of software-related events is displayed with a start timestamp associated with an earliest start time of the plurality of software-related events and a stop timestamp corresponds to a timestamp for the first event of the second plurality of software-related events that has occurred during the period of time in response to the first event being a persistent event based on a single timestamp being the stop timestamp without the start timestamp, and
- wherein the indicator associated with the first event of the second plurality of software-related events is displayed with a start timestamp that corresponds to the timestamp for the first event of the second plurality of software-related events that has occurred during the period of time and a stop timestamp associated with a latest stop time of the plurality of software-related events in response to the first event being a persistent event based on a single timestamp being the start timestamp without the stop timestamp.

13. The system of claim 12, wherein the persistent event is an ongoing event that persists for a period of time and has one of a start time identified by the start timestamp and a stop time identified by the stop timestamp.

14. The system of claim 13, wherein the start time corresponds to a user logon to a network.

15. The system of claim 12, wherein the persistent event includes a start time and a stop time for the period of time, the start time corresponds to the start timestamp and the stop time corresponds to the stop timestamp.

16. The system of claim 15, wherein,
- the start time is assigned by identifying an earliest timestamp among a plurality of known timestamps and the stop time is assigned by identifying a latest-known timestamp among the plurality of known timestamps, and
- the plurality of known timestamps are imported timestamps sorted in chronological order.

17. The system of claim 12, wherein the persistent event is identified using only one discrete event having a timestamp at a single point during the timeframe.

18. The system of claim 12, wherein the persistent event includes a plurality of separate events spaced from each other along a timeframe, a first separate event of the plurality of separate events representing a start time for the persistent event and a second separate event of the plurality of separate events representing a stop time for the persistent event.

19. The system of claim 18, wherein the second plurality of software-related events are events occurring in chronological order after the start time for the persistent event and before the stop time for the persistent event.

20. The system of claim 12, wherein indicators for each of the second plurality of software-related events are associated with each other using one or more visually distinctive interface elements.

21. The system of claim 20, wherein the one or more visually distinctive interface elements includes a selected color being used for each indicator associated with the second plurality of software-related events.

* * * * *